United States Patent
Kushalnagar et al.

(10) Patent No.: US 7,574,176 B2
(45) Date of Patent: Aug. 11, 2009

(54) CHANNEL SELECTION IN A WIRELESS NETWORK

(75) Inventors: Nandakishore Kushalnagar, Portland, OR (US); Mousumi Hazra, Beaverton, OR (US); Mustafa Demirhan, Hillsboro, OR (US); Jasmeet Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 11/089,888

(22) Filed: Mar. 24, 2005

(65) Prior Publication Data

US 2006/0217137 A1  Sep. 28, 2006

(51) Int. Cl.
*H04B 1/00* (2006.01)
*H04B 15/00* (2006.01)
(52) U.S. Cl. .................. 455/63.3; 455/63.1; 455/67.11; 455/67.13; 455/570
(58) Field of Classification Search ................ 455/63.1, 455/63.3, 63.4, 67.11, 67.14, 570, 114.2, 455/135, 226.3
See application file for complete search history.

(56) References Cited

U.S. PATENT DOCUMENTS

| | | | |
|---|---|---|---|
| 6,671,495 B1 * | 12/2003 | Lappetelainen et al. | 455/67.11 |
| 7,012,912 B2 * | 3/2006 | Naguib et al. | 370/343 |
| 2001/0039183 A1 * | 11/2001 | Kobayashi et al. | 455/63 |
| 2005/0085190 A1 * | 4/2005 | Nishikawa | 455/63.1 |

OTHER PUBLICATIONS

Demirhan et al., "Self Configuring Transmission Channel for Wireless Mesh Networks," ACM SIGCOMM Asia Workshop, Apr. 12-14, 2005, 9 pgs.

* cited by examiner

*Primary Examiner*—Tuan A Pham
(74) *Attorney, Agent, or Firm*—Schwabe, Williamson & Wyatt, P.C.

(57) ABSTRACT

A method of operation in a communications device is disclosed. The method of operation includes obtaining interference information associated with a plurality of channels, including age of the interference information, and selecting one of the plurality of channels, based at least in part on the interference information and their age. Communications devices, subsystems, and systems equipped to operate in the above described manner are also disclosed.

26 Claims, 5 Drawing Sheets

CHANNEL SELECTION IN A WIRELESS NETWORK

FIELD

Disclosed embodiments of the present invention relate to the field of communications, and more particularly to wireless networking.

BACKGROUND

Nodes within a wireless network typically communicate using radio frequency signals, although other forms of electromagnetic radiation may be utilized as well. Wireless networks often encounter interference from a number of sources, including other wireless networks and electromagnetic emissions from a number of devices. For example, a wireless network operating in the 2.4 gigahertz (GHz) frequency band may experience interference from a device as common as a microwave oven, a device not designed to radiate into the general environment. As wireless networks continue to be deployed, potential interference problems between multiple wireless networks will continue to grow.

BRIEF DESCRIPTION OF THE DRAWINGS

Embodiments of the present invention will be described by way of the accompanying drawings in which like references denote similar elements, and in which.

DETAILED DESCRIPTION OF ILLUSTRATIVE EMBODIMENTS

Embodiments of the present invention include but are not limited to a method of operation in a communications device. The method of operation includes obtaining interference information associated with a plurality of channels, including age of the interference information, and selecting one of a plurality of available channels, based at least in part on the interference information and their age. Embodiments of the present invention include but are not limited to communications devices, subsystems, and systems equipped to operate in the above described manner.

The following discussion is primarily presented in the context of wireless networks. It is understood that the principles described herein may apply to other communications networks.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising," "having" and "including" are synonymous, unless the context dictates otherwise.

Figure 1:
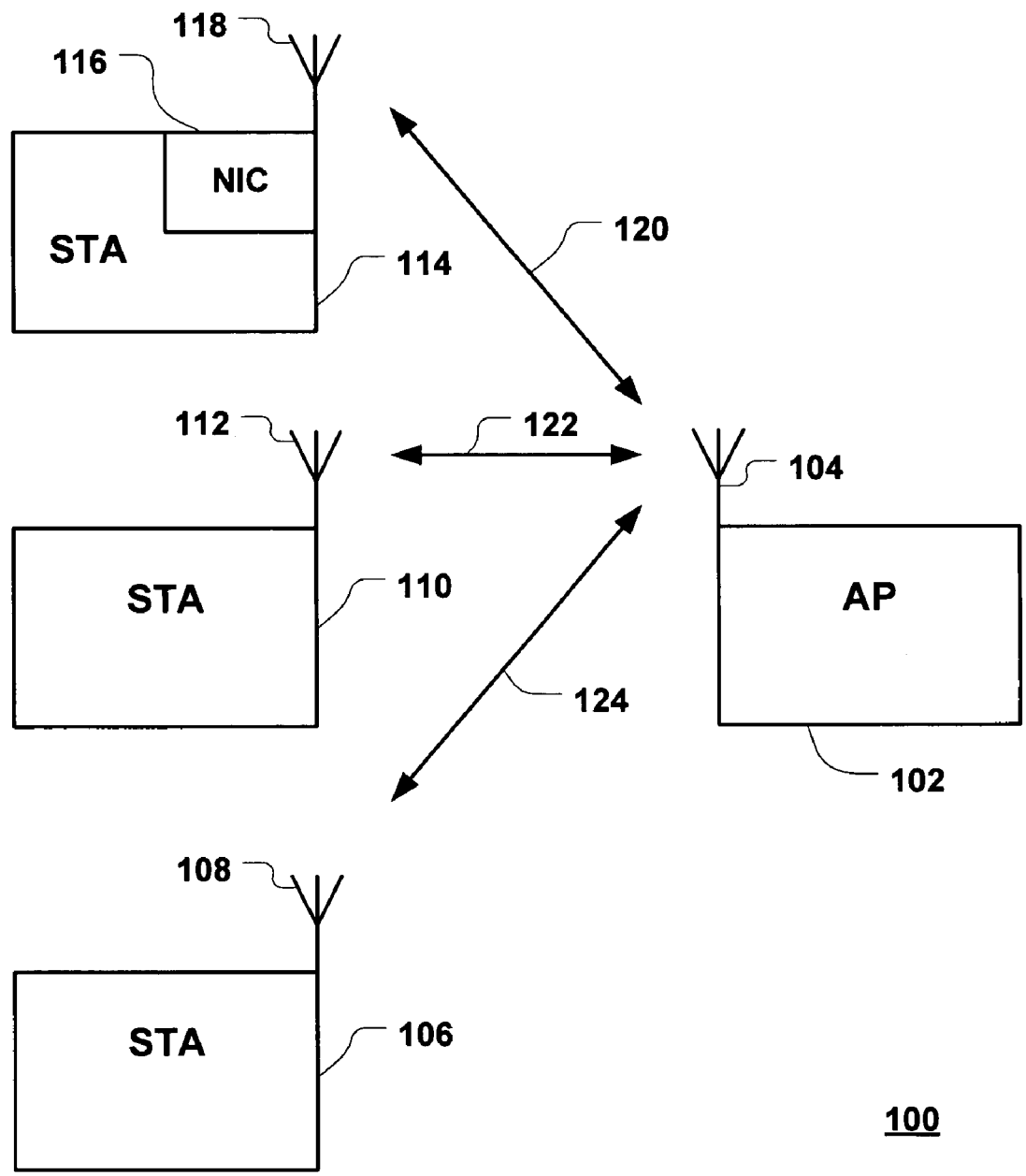
FIG. 1 is a block diagram illustrating some of the functional blocks of a wireless network, in accordance with an embodiment of this invention.

FIG. 1 is a block diagram illustrating some of the functional blocks of a wireless network, in accordance with an embodiment of this invention. As illustrated, wireless network 100 may comprise of access point (AP) 102, and stations (STA) 106, 110, and 114. In some embodiments, AP 102, and STAs 106, 110, and 114 may include antennas 104, 108, 112, and 118, respectively. In alternative embodiments, other means for relaying signals between an AP and a STA may be used, for example, infrared transmitters and detectors. AP 102 serves as a point of network access for STAs 106, 110, and 114. In some embodiments, the network accessed by a STA may be a local area network with an AP being connected to such a network via a fixed line or some other means, including a wireless link (not shown). In other embodiments, other types of networks may be involved. In various embodiments, AP 102 and at least one of STAs 106, 110, and 114, may be compliant or compatible with the Institute of Electrical and Electronics Engineers (IEEE) 802.11 standard, IEEE std. 802.11-1999, reaffirmed Jun. 12, 2003, forming an 802.11 network. The term, 802.11, will be used herein to refer to all IEEE 802.11 standards, including past, present, and future versions.

In various applications, one or more STAs 106, 110, and 114 may comprise a network interface card (NIC), a cellular phone, a personal digital assistant (PDA), a handheld computer, a laptop computer, a personal computer, a set-top box, a handheld gaming device, a game console, a video display, a video camera, or any such device that may make use of network access.

While the embodiment in FIG. 1 shows one AP, other embodiments may include a greater number of APs or no APs. In the case of a network being formed without an AP, STAs may communicate directly with each other in an ad-hoc network. In various embodiments, one AP may serve as a hub in a hub-and-spoke configuration. In various other embodiments, multiple APs may form a mesh network in a mesh configuration. An STA may include a NIC, as in STA 114 including NIC 116, that provides STA 114 with the functionality to access a wireless network. While the embodiment in FIG. 1 shows three STAs, other embodiments may include a greater or lesser number of STAs.

AP 102 may communicate with STAs 106, 110, and 114 via signals 124, 122, and 120, respectively. Signals 124, 122, and 120 may utilize one of a number of available channels. A channel in a communications medium may be defined in any number of ways, including a frequency band, a time period, a coding scheme (for example, in embodiments making use of spread spectrum techniques), a combination of spatial and other information, and the like, including multiple combinations of differentiating a communications medium. Channels are defined in various ways for particular communications protocols, and various embodiments may make use of various communications protocols. In some embodiments, while operating on a channel, hereinafter referred to as the operational channel, AP 102 and STAs 106, 110, and 114, may obtain interference information concerning the operational channel. In alternative embodiments, such interference information may be obtained by AP 102 without input from networked STAs. If AP 102 or one of its networked STAs detect interference in the operational channel, one of a plurality of available channels may be selected.

In some embodiments, the interference information may be stored among an AP and one or more STAs. In other embodiments, all stored data may reside on either an AP or one or more STAs. Depending on the configuration of the network, data may be stored on multiple APs. In other embodiments, the interference information and their age may be stored elsewhere.

In some embodiments, a STA may act as a client of an AP. In a hub-and-spoke configuration, one AP may communicate with one or more STAs. In such a network, a channel selection method may be coordinated by an AP, switching to a channel designated by the AP. In some embodiments, detection of interference may be performed by both an AP and its networked STAs, as one device may experience interference not detected by other devices in the network. Embodiments of the invention are not limited to hub-and-spoke networks, and may also be implemented on mesh networks. In some embodiments, a STA-formed ad-hoc network may be utilized, for example, STA-enabled laptops or handheld gaming devices operating within close proximity to one another.

Figure 2:
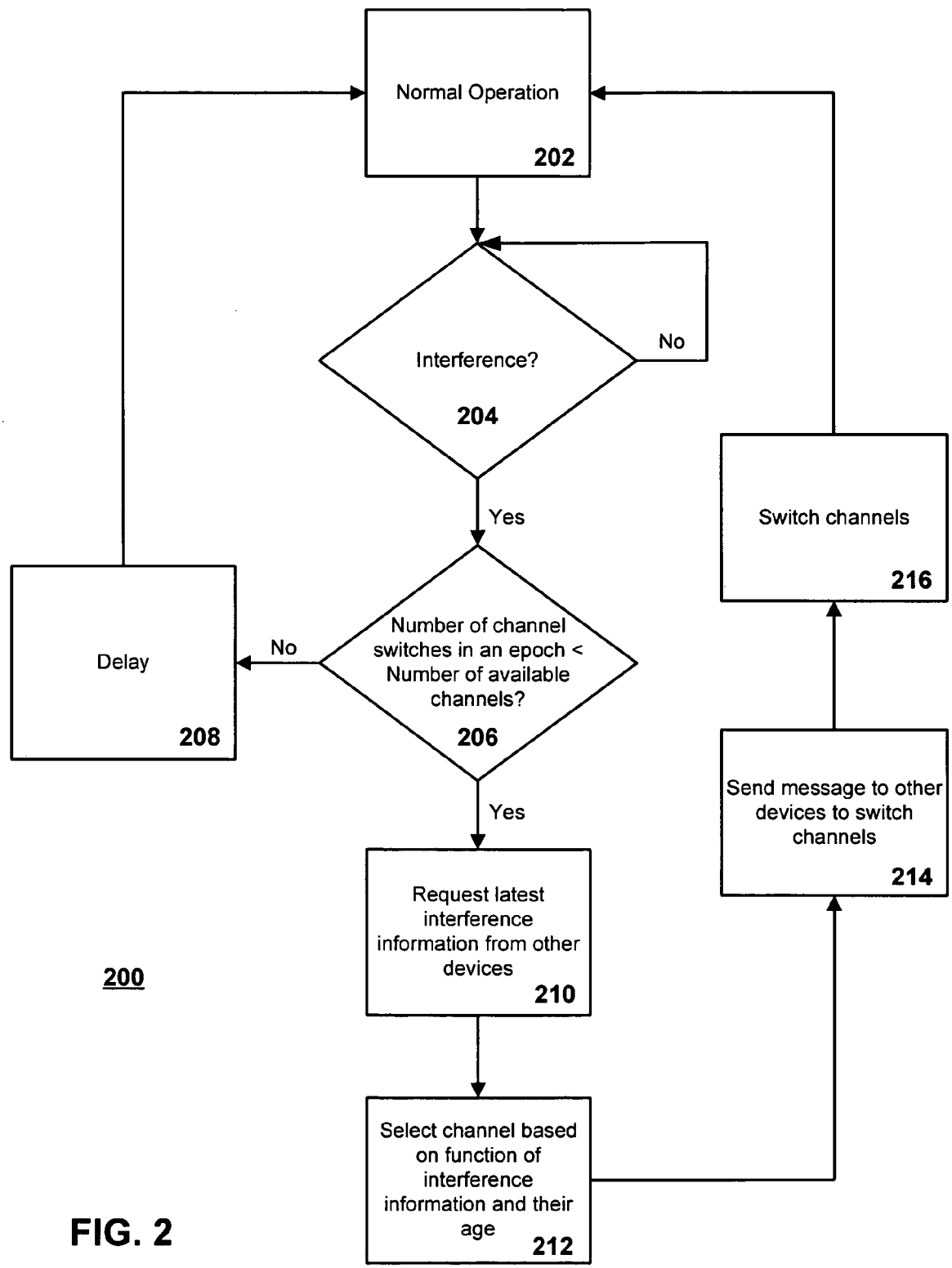
FIG. 2 is a flow diagram illustrating a portion of a method of operation in a communications device, in accordance with an embodiment of this invention.

FIG. 2 is a flow diagram illustrating a portion of a method of operation 200 in a communications device, in accordance with an embodiment of this invention. The method of operation illustrated in FIG. 2 may apply to a communications device that is coordinating the network connection between itself and other communications devices. As illustrated, the method includes block 202, where the communications device is in a state of normal operation. Interference may be periodically or continuously monitored, as illustrated by block 204, until interference is detected. In some embodiments, detecting interference above a predetermined threshold level in an operational channel may trigger selecting a channel among a group of channels, where the group of channels does not include the operational channel. In alternate embodiments, it may.

The method may, in some embodiments, include block 206, where the number of channel switches in an epoch or time period is compared with the number of available channels. This operation may serve to assist in preventing thrashing, wherein the communications device continually cycles through all the available channels if all the available channels contain interference. The epoch designated may vary depending on the specific network at issue, and the operational environment of the network. For example, in one embodiment, the epoch may be specified as the time it would take the communications device to switch through all of the channels if interference were detected immediately after each channel became the operational channel. If the number of channel switches in an epoch is not less than the number of available channels, then the communications device has cycled through all the available channels in the specified time period. In some embodiments, a delay operation, with predetermined or calculated delay, block 208, may be implemented before returning to normal operation. In some embodiments, the current operational channel may remain the operational channel during such a delay. In various other embodiments, the device may switch to another channel for the duration of the delay before returning to normal operation.

In some embodiments, if the number of channel switches in an epoch is less than the number of available channels, the device may request the latest interference information from other devices in the network, block 210. In some embodiments, if the communications device is a Wireless Local Area Network (WLAN) AP, then other devices in the network may include WLAN stations. In some embodiments, once the latest interference information has been requested and either received or a predetermined time period has elapsed, a channel among the available channels in the network may be selected based on a function including obtained interference information and their age.

In various other embodiments, a channel may be selected based on historical interference information as known when interference is first detected in the operational channel. In these embodiments, an operation like block 210 would not be implemented before new channel selection. In various other embodiments, requesting the latest interference information from other devices on the network may be performed depending on the demands of the applications then currently running on the network.

Next, the device selects a channel, block 212, based at least in part on the interference information. Once a channel has been selected, a message may be sent to other devices on the network to switch to the newly selected channel, as represented by block 214. The message may include a designated time or other means to synchronize switching among the networked devices to facilitate a smooth transition to the newly selected channel. In due course, all applicable devices switch to the newly selected channels, block 216. After the devices on the network have switched to the newly selected operational channel, normal operation may continue.

In various embodiments, a communications device may obtain interference information and their age in a number of ways, including from a local storage device. A communications device may likewise store interference information and their age in a number of ways, including to a local storage device. Age may include the time at which interference information was captured. Interference information may include some measurement of interference experienced in a particular channel while a communications device was last operating in that channel. In various embodiments, interference information may be captured as a measurement or a collection of measurements corresponding in some manner to interference detected. In various embodiments, interference information may be captured as a numeric representation that in some way incorporates an interference measurement or a number of interference measurements. In various other embodiments, interference information may be captured in a different way than described above.

In some embodiments, the selection of a channel may be targeted to choosing a channel that is likely to experience a lower amount of interference than being experience by the current channel in use. In various other embodiments, the selection of a channel may be targeted to choosing a channel among a number of channels that is likely to experience a lowest amount of interference among the channels being considered.

In some embodiments, interference information may be weighted by their age, and selecting a channel may be based at least in part on the weighted interference information. More recent interference information may be weighted more heavily than less recent interference information in the process of selecting a channel. One embodiment may utilize the following example function to estimate the channel with the least amount of interference: f(age, interference information)=e1/($\alpha$*age+$\beta$*interference information), where $\alpha$ and $\beta$ are constant tuning parameters.

In various embodiments, the channel selection process may comprise one or more operations. In one embodiment, a roulette probability algorithm may be used as an additional operation in addition to the use of a function, such as the example exponential function above. In brief, a roulette probability algorithm may be used to divide a logical circle into a number of logical sectors based on the values returned by a function, with each logical sector corresponding to an available channel of operation. The size of the logical sector would depend on the value returned by the chosen function, with a larger logical sector having a higher probability of being selected when the wheel is computationally spun. Initially, a scan of all available channels may be performed to initially populate the computational wheel, or the first channel switches may be made randomly, building the logical sectors as interference information is collected from each operational channel. In various other embodiments, other functions may be utilized, with or without additional algorithms or channel selection methods. In other embodiments, an additional selection operation other than a roulette probability algorithm may be utilized.

In some embodiments, the communications device may be an AP operating on an 802.11 WLAN, and the AP may coordinate the channel switch among itself and its stations. In various other embodiments, an 802.11 WLAN may comprise of an ad-hoc network among multiple stations, wherein one station may coordinate switching the operational channel of the ad-hoc network with the other stations in the ad-hoc network. In various other embodiments, other communications networks may utilize the method of operation illustrated in FIG. 2. In some embodiments, the method of operation may be implemented or cooperatively implemented by a computing device coupled to an AP or a station.

Figure 3:
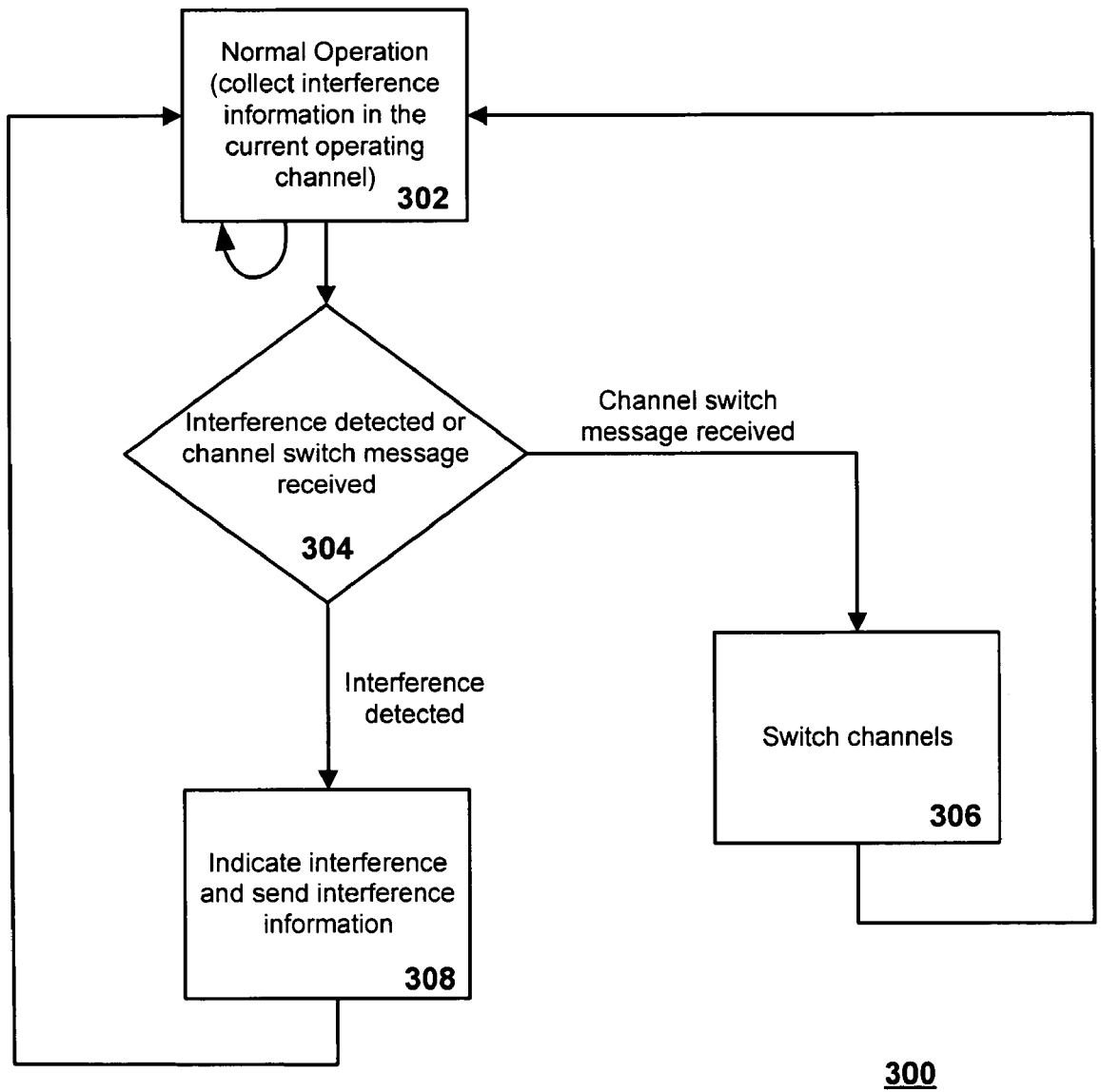
FIG. 3 is a flow diagram illustrating a portion of a method of operation in a communications device, in accordance with an embodiment of this invention.

FIG. 3 is a flow diagram illustrating a portion of a method of operation 300 in a communications device, in accordance with an embodiment of this invention. The method of operation illustrated in FIG. 3 may apply to a communications device that is not coordinating the operating channel of the network or the network connection, for example, a client communications device. As illustrated, the method includes block 302, where the communications device is in a state of normal operation. Interference information may be periodically or continuously collected while the communications device is in normal operation. The state of normal operation may end upon events such as interference being detected or receipt of a channel switch message from a controlling communications device, as illustrated by block 304. The term, controlling communications device, is used herein to denote a communications device in a network with some control capability regarding the selection of the operational channel.

Upon detection of interference, which may include any interference or interference above a predetermined or calculated threshold, the method may, in some embodiments, include block 308, where the communications device directly or indirectly indicates to a controlling communications device in the network that interference has been detected. The communications device may also send interference information to a controlling communications device, as also illustrated in block 308. In some embodiments, the interference information may be sent in the operational channel. After directly or indirectly reporting in some manner to a controlling communications device in the network, the communications device may return to the state of normal operation, block 302. If the controlling communications device ascertains that the operational channel should be changed, which may be due to several reasons such as due to interference detected as mentioned above or operating in a sub optimal channel, a channel switch message may be received by the communications device, which may take the communications device out of the state of normal operation.

If a channel switch message is received, the communications device may switch to another channel (designated by the channel switch message), as illustrated by block 306. After switching to the other (designated) channel, the communications device may return to the state of normal operation (using the newly selected channel), block 302.

In some embodiments, the communications device may be a station operating on an 802.11 WLAN, and the controlling communications device may be an AP that coordinates the channel switching among itself and its networked stations. In some 802.11 embodiments, 802.11k report messages may be used to report interference detected by a station to an AP. In various embodiments, an 802.11 WLAN may comprise of an ad-hoc network among multiple stations, wherein the communications device may comprise one station and the controlling communications device may comprise another station that coordinates switching the operational channel of the ad-hoc network. In various other embodiments, other communications networks may utilize the method of operation illustrated in FIG. 3. In some embodiments, the method of operation may be implemented or cooperatively implemented by a computing device coupled to a station.

Figure 4:
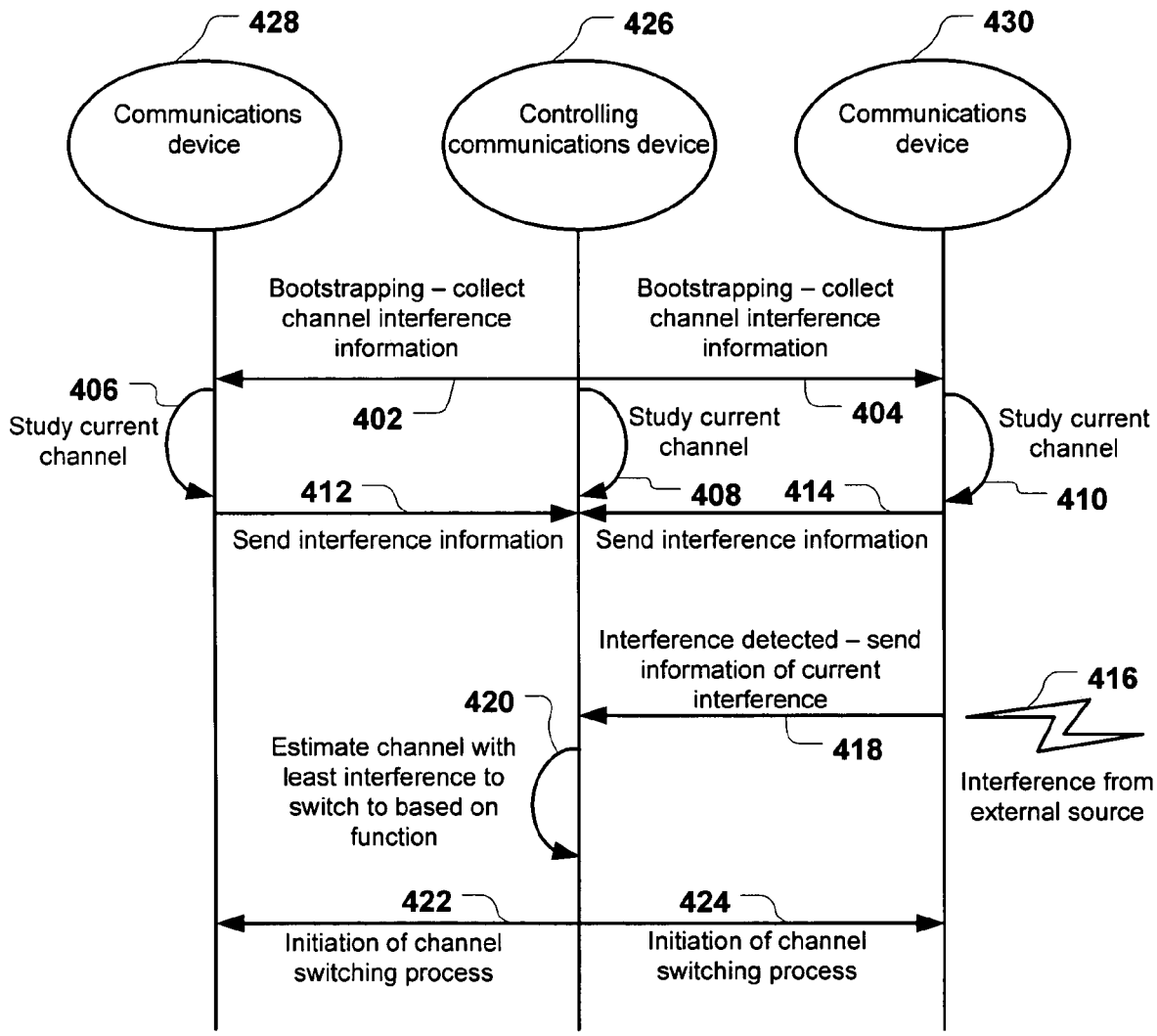
FIG. 4 illustrates a diagram showing some of the events and actions that may take place in a wireless network, in accordance with an embodiment of this invention.

FIG. 4 illustrates a diagram 400 showing some of the events and actions that may take place in a wireless network, in accordance with an embodiment of this invention. The events and actions depicted in FIG. 4 are not meant to be a complete description of all events and actions, but are rather meant to be illustrative of some of the operations of one embodiment of the invention. These operations are not presented in any particular sequence in accordance with which embodiments of the invention must follow.

Bootstrapping 402, 404 may be initiated by a controlling communications device 426 in a network, and other communications devices in the network may participate (here, communications devices 428, 430). Bootstrapping may refer to an initial boot-up phase, where the controlling communications device 426 and other communications devices 428, 430 may scan all available channels to initially collect interference information. Time associated with the interference information (from which age may be inferred) may also be collected, even though the interference information may be collected within very close time proximity to one another.

Once bootstrapping is complete, controlling communications device 426 and other communications devices 428, 430 may also study the current channel 406, 408, 410 on an on-going or periodic basis. Communications devices 428, 430 may send interference information, such sending being represented by operations 412 and 414, to a controlling communications device 426 for the controlling communications device to use in estimating a channel of relatively low, or even least, interference upon an event such as interference from external source 416. A controlling communications device may also have such a new channel continually estimated in preparation for possible interference notification. As illustrated as an example, communications device 430 detects interference from external source 416 and relays information concerning this event to controlling communications device 426, with the relaying of information being depicted by operation 418. Upon receiving such information, controlling communications device 426 may estimate the channel with low, or even least, interference based on a function 420.

Controlling communications device 426 may then initiate channel switching process 422, 424.

Figure 5:
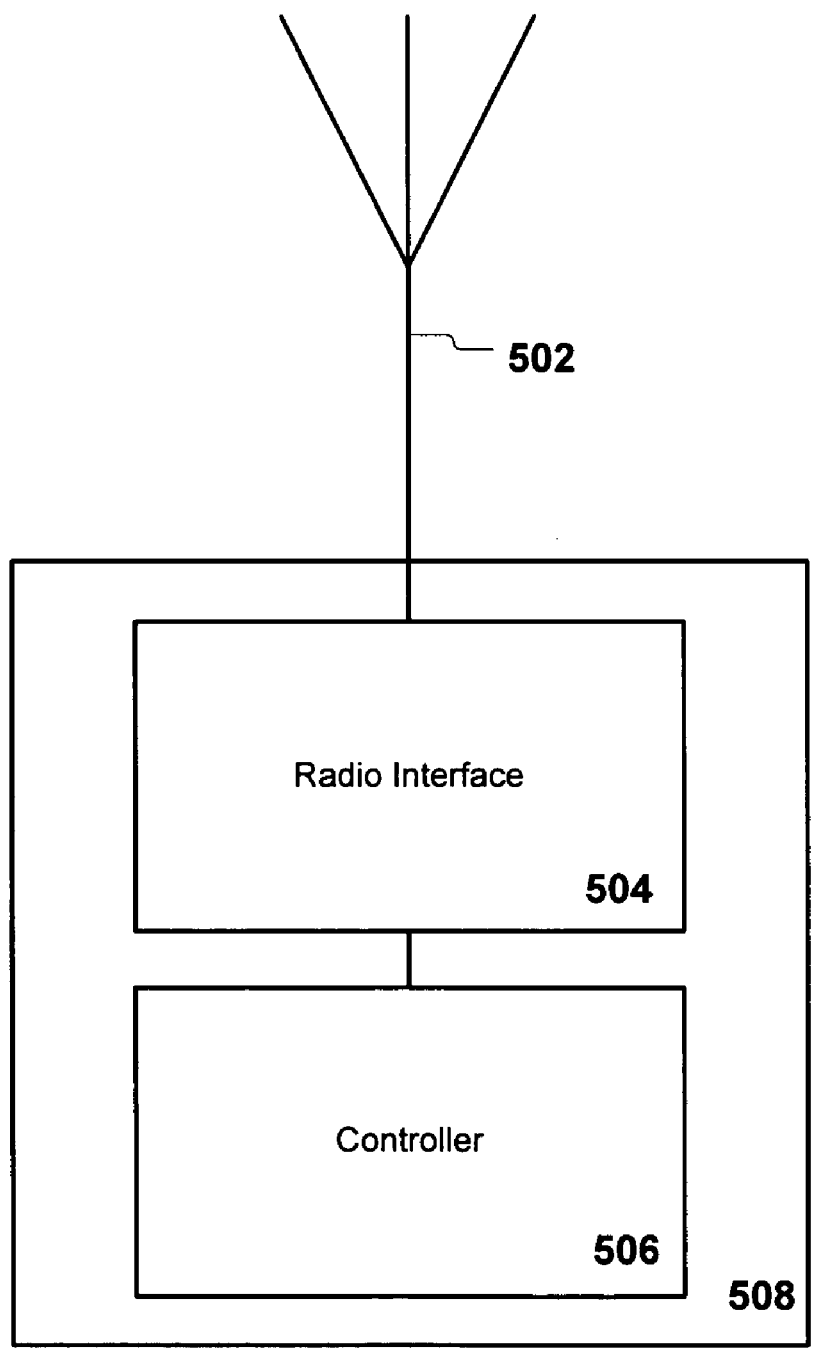
FIG. 5 illustrates some components of a wireless system, in accordance with an embodiment of this invention.

FIG. 5 illustrates some components of a wireless system, in accordance with an embodiment of this invention. In various embodiments, wireless system 500 may include one or more substantially omnidirectional antennae, represented by antenna 502. In some embodiments, wireless system 500 may include one such antenna. In some other embodiments, wireless system 500 may include two or more such antennae, for example to provide a spatial division multiple access (SDMA) system or a multiple input, multiple output (MIMO) system. In various embodiments, one or more of the one or more antennae may comprise a dipole antenna. In various other embodiments, a dipole antenna may not be used. In various embodiments, different types of antennae may be used, including different types of antennae coupled to the same communications system. In various embodiments, wireless system 500 may include subsystem 508. Subsystem 508 may be coupled to at least one of the one or more antennae, as represented by antenna 502. In various embodiments, subsystem 508 may comprise radio interface 504 and controller 506.

Controller 506 may be coupled to radio interface 504 and may be designed to operate in conjunction with radio interface 504 to obtain interference information associated with a plurality of channels, including timing of the interference information (from which age may be subsequently inferred), and select one of the plurality of channels, based at least in part on the interference information and their age (which may be subsequently inferred from their timing).

In some embodiments, controller 506 may be coupled to a controller readable medium (not shown) comprising a storage medium having a plurality of instructions stored therein designed to perform at least some of the operations described herein. In some embodiments, controller 506 may include a controller readable medium (not shown) comprising a storage medium having a plurality of instructions stored therein designed to perform at least some of the operations described herein. In various embodiments, the storage medium may comprise of any type of storage medium, including electronic memory, magnetic memory, or any type of past, present, or future storage medium consistent with the principles of an embodiment of this invention.

In various embodiments, wireless system 500 may comprise or be integrated in a communications device in a wireless network, such as an access point or a station. In various other embodiments, wireless system 500 may comprise or be integrated in a communications device in a wireless sensor network. In various embodiments, wireless system 500 may comprise or be integrated in an 802.11 compliant or compatible access point. In various embodiments, wireless system 500 may comprise or be integrated in an 802.11 compliant or compatible station. In various embodiments, wireless system 500 may be integrated in any number of electronic devices to augment the electronic devices' abilities. Such electronic devices include, for example, a handheld computer, a laptop computer, a personal computer, a set-top box, a game console, a video display, a home entertainment console, a video camera, or any such device that may make use of network access.

Thus, it can be seen from the above description, a method of operation in a communications device, wherein interference information associated with a plurality of channels is obtained, including age of the interference information, and one of the plurality of channels is selected, based at least in part on the interference information and their age, is described. Communications devices, subsystems and systems equipped to operate in the above manner have also been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A method of operation in a communications device, comprising:
   obtaining interference information associated with a plurality of channels, including age of the interference information;
   weighting the interference information by age with more recent interference information given more weight; and
   selecting one of the plurality of channels, based at least in part on values returned by an exponential function, the exponential function incorporating the interference information and their age.

2. The method of claim 1, wherein said obtaining comprises retrieving the interference information and their age from a local storage device.

3. The method of claim 2, wherein the method further comprises storing the interference information into said local storage device, including corresponding times the interference information was captured.

4. The method of claim 1, wherein the method further comprises capturing the interference information.

5. The method of claim 1, wherein the interference information comprises interference experienced in the corresponding channels when the corresponding channels were last used.

6. The method of claim 1, wherein said selecting is performed in response to a current channel experiencing an amount of interference in excess of a predetermined threshold level.

7. The method of claim 6, wherein the selecting comprises selecting a channel among the plurality of channels that is likely to experience a lower amount of interference than being experience by the current channel, if possible.

8. The method of claim 7, wherein the selecting further comprises selecting a channel among the plurality of channels that is likely to experience a lowest amount of interference among the plurality of channels being considered.

9. The method of claim 6, wherein said obtaining and selecting are responsively performed only after said current channel has been employed for at least a predetermined amount of time.

10. The method of claim 6, wherein the method further comprises switching from the current channel to the selected channel.

11. An apparatus comprising:
   a radio interface; and
   a controller, the controller coupled to the radio interface and designed to operate
   in conjunction with the radio interface to:
      obtain interference information associated with a plurality of channels, including timing of the interference information,
      weight the interference information by age inferred from the timing with more recent interference information given more weight, and
      select one of the plurality of channels, based at least in part on values returned by an exponential function, the exponential function incorporating the interference information and their age.

12. The apparatus of claim 11, wherein the controller is further designed to store the interference information into a local storage device, including corresponding times the interference information was captured.

13. The apparatus of claim 11, wherein the interference information comprises interference experienced in the corresponding channels when the corresponding channels were last used.

14. The apparatus of claim 11, wherein the controller selects one of the plurality of channels in response to a current channel experiencing an amount of interference in excess of a predetermined threshold level, the current channel not being one of said plurality of channels.

15. The apparatus of claim 14, wherein the controller selects a channel among the plurality of channels that is likely to experience a lower amount of interference than being experience by the current channel, if possible.

16. The apparatus of claim 14, wherein the controller selects a channel among the plurality of channels that is likely to experience a lowest amount of interference among the plurality of channels being considered.

17. The apparatus of claim 14, wherein the controller selects a channel only after said current channel has been employed for at least a predetermined amount of time.

18. A system comprising:
one or more substantially omnidirectional antenna(e); and
a subsystem coupled to at least one of the one or more substantially omnidirectional antenna(e), the subsystem including
a radio interface, and
a controller, the controller coupled to the radio interface and designed to operate in conjunction with the radio interface to
obtain interference information associated with a plurality of channels, including timing of the interference information,
weight the interference information by age inferred from the timing with more recent interference information given more weight, and
select one of the plurality of channels, based at least in part on values returned by an exponential function, the exponential function incorporating the interference information and their age.

19. The system of claim 18, wherein the system comprises an 802.11 compliant or compatible access point.

20. The system of claim 18, wherein the system comprises an 802.11 compliant or compatible station.

21. The system of claim 18, wherein the system comprises a selected one from the group consisting of a set-top box, a game console, a home entertainment console, a video display, and a video camera.

22. A controller readable medium comprising:
a storage medium; and
a plurality of instructions stored in the storage medium, the instructions designed to enable an apparatus to
obtain interference information associated with a plurality of channels, including age of the interference information,
weight the interference information by age with more recent intereference information given more weight,
select one of the plurality of channels, based at least in part on values returned by an exponential function, the exponential function incorporating the interference information and their age.

23. The controller readable medium of claim 22, wherein the interference information comprises interference experienced in the corresponding channels when the corresponding channels were last used.

24. The method of claim 1, wherein the selecting further comprises selecting one channel from among two or more channels experiencing interference.

25. The method of claim 24, wherein the selecting comprises selecting the channel from among the two or more channels that is likely to experience a lower amount of interference than at least one other channel of the two or more channels.

26. The method of claim 24, wherein the selecting comprises selecting the channel from among the two or more channels that is likely to experience a lowest amount of interference among the other channels of the two or more channels.

* * * * *

UNITED STATES PATENT AND TRADEMARK OFFICE
CERTIFICATE OF CORRECTION

PATENT NO. : 7,574,176 B2  
APPLICATION NO. : 11/089888  
DATED : August 11, 2009  
INVENTOR(S) : Kushalnagar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Seventh Day of September, 2010

David J. Kappos  
*Director of the United States Patent and Trademark Office*